(Model.)

E. W. HOLT.
TRUSS PAD.

No. 390,782. Patented Oct. 9, 1888.

WITNESSES:

INVENTOR:
E. W. Holt

BY Munn & Co
ATTORNEYS.

 UNITED STATES PATENT OFFICE.

EDWARD W. HOLT, OF BROOKLYN, NEW YORK.

TRUSS-PAD.

SPECIFICATION forming part of Letters Patent No. 390,782, dated October 9, 1888.

Application filed March 25, 1887. Serial No. 232,390. (Model.)

*To all whom it may concern:*

Be it known that I, EDWARD W. HOLT, of Brooklyn, in the county of Kings and State of New York, have invented a new and Improved Truss-Pad, of which the following is a full, clear, and exact description.

My invention relates to a flexible and hollow truss-pad adapted to be inflated with air, water, or other fluid; and my invention consists, principally, in forming partitions in the interior of the pad, whereby the inflating medium is kept from shifting materially from the point at which the pad is in contact with the body.

The invention also consists in making the pad or partitions inflatable by the use of a piece of raw or unadulterated rubber, which may be penetrated with a small sharp and hollow instrument or tube for inflating the pad, and which may then be withdrawn without making a permanent opening in the pad—a result which cannot be accomplished with vulcanized rubber.

Reference is to be had to the accompanying drawings, forming a part of this specification, in which similar letters of reference indicate corresponding parts in both the figures.

Figure 1:
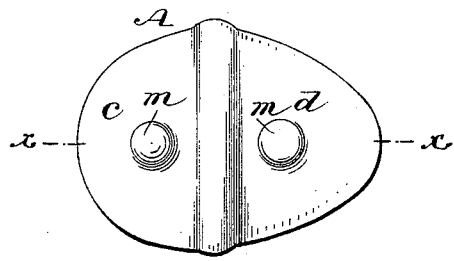
Figure 2:
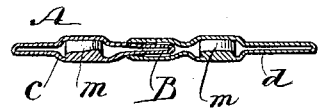

Figure 1 is a plan view of my new and improved truss-pad; and Fig. 2 is a sectional view of the same, taken on the line $x \, x$ of Fig. 1.

The pad A is made hollow and air-tight and of soft india-rubber or other flexible material, and is provided with a central partition, B, which is of rubber and of less width than the space within the pad when inflated, so that when the pad is inflated the inflating medium (air or water) will be confined in separate chambers of the pad and prevented from shifting from one part of the pad to another when pressure is applied to any part of the exterior of the pad. In this manner the pad is made much firmer than the ordinary inflated rubber pad, and when bound with a truss-spring upon the body the pressure of the pad may be centralized and maintained upon a single point or part of the body. The pressure being exerted at this point, the partitions B prevent the inflating medium from being materially displaced or forced to either side or end or other parts of the interior of the pad, as it would be if the partition were omitted. Hence the pad is much more serviceable and much more satisfactory than the ordinary form of inflated pad.

The pad A is made in two sections, $c$ and $d$, and cemented together. The section $c$ and partition B are by preference made integral, while the section $d$ is open at one side, to close upon the section $c$ over the partition B, where the seam is formed. The sections $c \, d$ are charged with sulphur, and a piece, $m$, of raw or unadulterated rubber is placed upon the inside of each section $c \, d$, and the whole is then subjected to heat for vulcanizing the sections $c \, d$, leaving the pieces $m$ raw, so that a small sharp and hollow tube, like that of a hypodermic syringe, may be passed into the respective chambers of the pad and water or air introduced for inflating the pad. The hollow filling-tube being removed, the raw-rubber pieces $m$ will close by their natural elasticity and close the openings and prevent the escape of the inflating medium.

The incision made by the filling-tube will not only close when the same is withdrawn, but it will also "heal," as it is well known that an incision or cut in raw rubber will heal or grow together almost as soon as the instrument causing the same is withdrawn. Therefore it will be manifest that neither prior to or after being filled will the buttons be apertured.

Having thus fully described my invention, I claim as new and desire to secure by Letters Patent—

1. A single hollow flexible truss-pad consisting of a hollow imperforate air-tight section and a second imperforate section, open at one end, receiving one side of the opposite section in said open end and secured thereto by an air-tight joint, whereby two separate and distinct air-tight compartments are formed, substantially as set forth.

2. A hollow flexible truss-pad provided with a button of raw rubber, whereby an incision or aperture made through said button will readily heal and the button be rendered or remain imperforate.

3. A truss-pad having an internal imperforate partition dividing the pad into two air-tight compartments and a raw-rubber button in the side or wall of each compartment.

EDWARD W. HOLT.

Witnesses:
  H. A. WEST,
  C. SEDGWICK.